Feb. 9, 1960  R. R. REID, SR  2,924,257
MEAT CHOPPERS
Filed Feb. 16, 1959
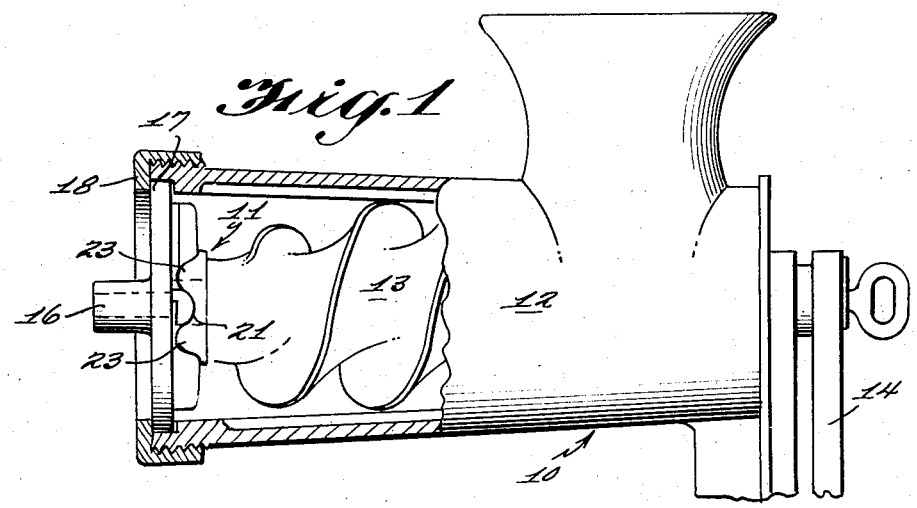
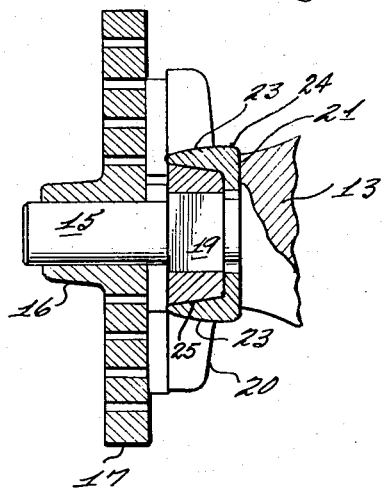
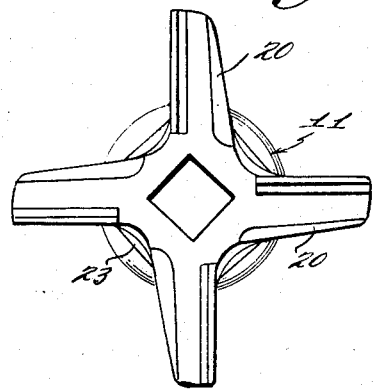
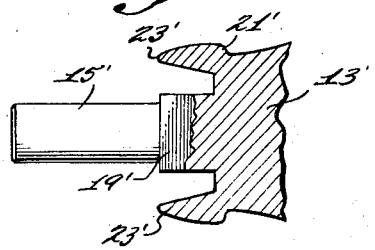
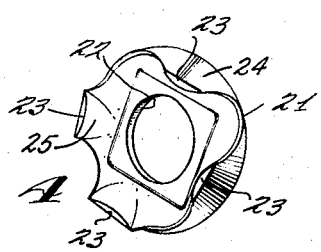
INVENTOR
REMER R. REID, SR.
BY  Adams + Bush
ATTORNEY United States Patent Office 2,924,257
Patented Feb. 9, 1960

2,924,257

MEAT CHOPPERS

Remer R. Reid, Sr., Atlanta, Ga., assignor of one-half to Eugene A. Anderson

Application February 16, 1959, Serial No. 793,587

5 Claims. (Cl. 146—189)

This invention relates to food choppers and has more particular reference to food choppers employed for chopping or grinding meat.

One object of the present invention is to provide a novel and improved food chopper for chopping or grinding meat having a device mounted therein in association with the knife for preventing sinews and gristle from forming a ball back of the knife and thereby expediting the grinding of the meat.

Another object of the present invention is to provide a meat chopper, as characterized above, wherein the device is in the form of a ring-shaped member having circumferentially spaced laterally extending wings projecting between the blades of the knife adjacent their bases, whereby the meat will flow smoothly between the blades of the knife and be forced against the end plate of the chopper.

Another object of the present invention is to provide a device for use with meat choppers for preventing sinews and gristle from forming a ball back of the knife and which may be readily mounted on existing meat grinding choppers and, when so assembled, may be readily disassembled for purposes of cleaning the apparatus.

A further object of the present invention is to provide a device which may be made as an integral part of a meat chopper or as an attachment for use therewith for preventing sinews and gristle from forming a ball back of the knife, and which is simple and economical in construction and efficient in carrying out its intended function.

Other objects and advantages of the invention will appear in the following specification when considered in connection with the accompanying drawing, wherein:

Fig. 1 is a fragmentary side elevation of a meat chopper, with parts shown in section, and having a device constructed in accordance with the present invention mounted therein for preventing sinews and gristle from forming a ball at the back of the knife;

Fig. 2 is an enlarged fragmentary vertical sectional view of the meat chopper shown in Fig. 1, showing the plate, the knife, and the device for preventing the formation of meat balls back of the knife;

Fig. 3 is an end view of the knife with the ring-shaped attachment mounted thereon;

Fig. 4 is a perspective view of the ring-shaped attachment; and

Fig. 5 is a fragmentary detail section showing how the ring-shaped attachment may be formed integral with the end of the worm.

The present invention provides a food chopper for chopping and grinding meat having a device mounted therein in association with the knife and worm for preventing sinews and gristle from forming a ball back of the knife.

In general, the device comprises a ring-shaped member having circumferentially spaced laterally extending wings formed around its periphery with the wings extending between the blades of the knife.

The invention contemplates that the device may be a separate member mounted on the stud of the worm back of the knife, or it may be formed integral with the worm.

Referring now to the drawing, there is illustrated, in Fig. 1, a food chopper, indicated generally at 10, and having a ring-shaped device, indicated generally at 11, mounted therein and constructed in accordance with the present invention for preventing sinews and gristle from forming a ball back of the knife.

The food chopper 10 may be of any suitable commercial construction and, as shown, comprises a barrel 12 having a worm 13 mounted therein provided with a handle 14 and having its stud 15 journaled in a bearing 16 formed in the perforated end plate 17, and a cap member 18 threadedly mounted on the end of the barrel for holding the plate 17 in position. The stud 15 is shown as provided with a square section 19 adjacent the end of the worm, on which is mounted the usual type of knife 20.

The ring-shaped device 11 for preventing the sinews and gristle from forming a ball back of the knife is mounted on the stud of the worm back of the knife and is shown as comprising a disc-shaped member 21 provided with a central opening 22 and having a plurality of laterally extending circumferentially spaced wings 23 formed around its periphery with each wing projecting forwardly and adapted to extend between a pair of blades of the knife when mounted on the hub of the knife rearwardly of the blades. The peripheral surfaces forming recesses between the wing members 23 are curved so as to closely fit the back portions of the knife blades. The upper outer surfaces 24 of the wings curve downwardly and outwardly toward the forward side of the knife and the under outer surfaces 25 of the wings are curved to closely fit the spaces between the blades at their bases. The ends of the wings terminate in a plane which is rearward of the plane in which the cutting edges of the knife blade lie. The construction is such that the ring-shaped device will snugly fit on the back of the knife with the wings projecting forwardly between the blades thereof. The curvature of the wings facilitates the meat being forced between the blades and, together with the remaining body of the ring, prevents the formation of balls back of the knife by the meat. This construction also facilitates the grinding of the meat, makes the operation of the chopper more efficient, and speeds up the grinding operation.

While, in the modification described, the ring-shaped device 11 has been shown as a separate member, it is contemplated that it may be made integral with the worm, as illustrated in Fig. 5. As shown in Fig. 5, the disc-shaped member 21' is formed integral with the end of the worm 13' and its wings 23' are identical in construction with the modification shown in Figs. 1 to 4, inclusive, and operate in the same manner.

Obviously, if the stud 15', with its square section 19', is of the type which is threaded into the end of the worm, rather than being formed integral therewith, then the disc-shaped member 21' could be formed integral with the stud rather than with the worm.

The operation of the apparatus is believed obvious. When the ring-shaped device is used as a separate member it is mounted on the stud of the worm back of the knife, as shown in Fig. 1, and rotates with the knife and can be assembled and disassembled with the rest of the apparatus for purposes of cleaning. When the ring-shaped member is formed as an integral part of the stud or worm it, of course, may be removed with the stud or worm for purposes of cleaning.

From the foregoing, it readily will be seen that there has been provided a novel device for use with a meat chopper for preventing sinews and gristle from forming a ball back of the knife and facilitates the operation of the chopper, which device may be a separate member adapted to be assembled on the worm stud with the knife, or may be made as an integral part of the worm or stud.

Obviously, the invention is not restricted to the particular embodiment thereof herein shown and described.

What is claimed is:

1. A food chopper for grinding meat comprising a barrel, a perforated plate in the barrel, a worm rotatably mounted in the barrel, a knife operated by said worm, and means including a ring-shaped device mounted between the end of the worm and the knife and provided with a plurality of laterally projecting circumferentially spaced wings each projecting forwardly between an adjacent pair of knife blades for preventing the sinews and gristle in the meat from forming a ball at the back of the knife.

2. Apparatus as set forth in claim 1, wherein said ring-shaped member is integral with said worm.

3. Apparatus as set forth in claim 1, wherein said worm is provided with a stud journaled in said plate on which said knife and said ring-shaped member are mounted and wherein the peripheral surfaces of said ring-shaped member between said wings are curved so as to closely fit the back of the knife blade and the upper outer surfaces of the wings curve downwardly and outwardly toward the forward side of the knife and the under outer surfaces of the wings are curved to closely fit the knife between the blades at their bases and the ends of the wings terminate in a plane which is rearward of the plane in which the cutting edges of the knife blades lie.

4. An attachment for use with a meat chopper for preventing the sinews and gristle of the meat from forming a ball back of the knife comprising a disc-shaped member provided with a central opening and having a plurality of laterally extending circumferentially spaced wings around its periphery, said member being adapted to be mounted on the stud of the worm of a chopper between the end of the worm and the knife mounted thereon with each of said wings projecting laterally between an adjacent pair of blades of the knife.

5. An attachment as set forth in claim 4, wherein the peripheral surfaces of said disc-shaped member between said wings are curved so as to closely fit the back portions of the knife blades when mounted thereon and the upper outer surfaces of the wings curving downwardly and outwardly toward the forward side of the knife and the under outer surfaces of the wings are curved to closely fit the spaces between the blades of the knife at their bases.

References Cited in the file of this patent

UNITED STATES PATENTS 1,607,214    Smith _____ Nov. 16, 1926